May 26, 1970  KENJI ARIYASU ET AL  3,514,194

MOVIE FILM MAGAZINE FOR SYNCHRONOUS RECORDING AND REPRODUCING

Filed Jan. 9, 1968  2 Sheets-Sheet 1

INVENTORS
KENJI ARIYASU
AKIRA TSUJI
MASASHI YANAGIDA

BY Sughrue, Rothwell, Mion, Zinn & Macpeak

ATTORNEYS

INVENTORS
KENJI ARIYASU
AKIRA TSUJI
MASASHI YANAGIDA

United States Patent Office 3,514,194
Patented May 26, 1970

3,514,194
MOVIE FILM MAGAZINE FOR SYNCHRONOUS RECORDING AND REPRODUCING
Kenji Ariyasu and Akira Tsuji, Kanagawa, and Masashi Yanagida, Tokyo, Japan, assignors to Fuji Photo Film Co., Ltd., Minami-Ashigara-machi, Kanagawa, Japan
Filed Jan. 9, 1968, Ser. No. 696,640
Claims priority, application Japan, Jan. 9, 1967, 42/2,387
Int. Cl. G03b 23/02
U.S. Cl. 352—72          11 Claims

ABSTRACT OF THE DISCLOSURE

A movie film magazine for use with a camera or projector having a body portion and a cover portion, a film feed out hub and a film take up hub. A portion of the body portion is left exposed by the cover portion, that part which is exposed carries a loop maintaining roller and a sound recording and reproducing head.

BACKGROUND OF THE INVENTION

The present invention relates to a movie film magazine adapted to be used for a movie camera having a magnetic recording device therein and a movie projector having a magnetic reproducing device.

SUMMARY OF THE INVENTION

In the conventional movie projector and movie camera having a recording or reproducing means, the movie film has to be loaded through a number of rollers such as a capstan, sprocket wheel, fly wheel and the like. Therefore, it was difficult to load a movie film into the movie camera or movie projector.

According to the present invention, a movie film magazine is provided having rollers and movie film loaded therein, thereby eliminating the need for threading the film through rollers on the camera or projector. The principal object of this invention is to provide a movie film magazine of simple construction for carrying out the easy loading of film into the camera or projector with a recording or reproducing means.

DESCRIPTION OF THE PREFERRED EMBODIMENTS

Figure 1:
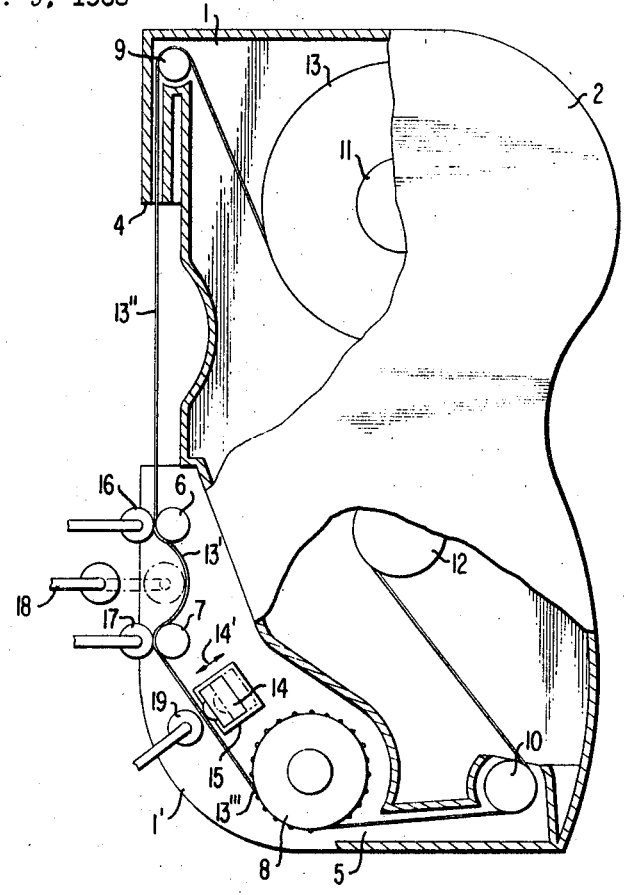
FIG. 1 is a view partly in section of the movie film magazine in accordance with the present invention.
Figure 2:
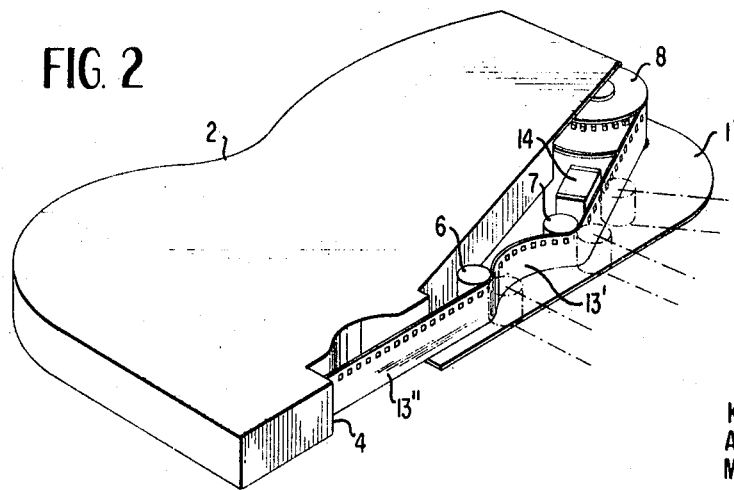
FIG. 2 is a perspective view of the movie film magazine shown in FIG. 1.

Referring to FIG. 1, the movie film magazine is constructed with a magazine body 1 and a magazine cover portion 2. Body portion 1 and cover portion 2 are made of plastics and fixed tightly to each other by means of some adhesive agent or supersonic welding. Magazine body portion 1 is a little larger than cover portion 2 and has an exposed portion 1', better seen in FIG. 2. The magazine has a film lead outlet 4 and a film inlet 5. On said exposed portion 1', a film feeding roller 6 is positioned to cooperate with a spring pressed roller 16 mounted on the camera or projector, a loop maintaining roller 7 is positioned to cooperate with a spring pressed roller 17 on the camera or projector, and a sprocket wheel 8 is mounted to be rotated by driving means in the camera or projector, not shown. A film lead-out roller 9 and a film guide-in roller 10 are rotatably mounted on body portion 1 in the neighborhood of film lead outlet 4 and film inlet 5, respectively. A film feed-out hub 11 and a film take-up hub 12 are rotatably mounted in the center portion of the film magazine. Movie film 13 is wound on the feed-out hub 11. The film passed over film lead-out roller 9, feed roller 6, loop maintaining rollers 7, sprocket wheel 8 and film guide-in roller 10 and is wound on take-up hub 12. The exposed portion 1' of the film magazine body portion 1 is provided with an opening 15 of a substantial size for a recording and reproducing head 14 to move therein in the direction shown by arrow 14'. Alternatively, the exposed portion 1' may be cut away between the feeding roller 7 and the sprocket wheel 8 as shown in FIG. 3.

When the movie film magazine constructed as described above is loaded into the movie camera or the movie projector, feeding roller 6 and loop maintaining roller 7 are moved against spring pressed rollers 16 and 17 of the camera or the projector so that a loop 13' is maintained between said rollers 6 and 7. Said spring out rollers 16 and 17 are applied to said rollers 6 and 7, in response to the closing movement of the back cover of the movie camera or the projector. Loop 13' is first formed by a loop forming lever 18. The loop forming lever 18 is moved back by any means before the taking or projecting is started.

Between the feeding roller 7 and the sprocket 8, a recording and reproducing head 14 is disposed in contact with the base surface of the film, and a spring pressed sound drum 19 is disposed in contact with the emulsion surface of the film, whereby the synchronous recording or synchronous reproducing is prepared. On taking or projecting the movie, the film 13 is intermittently carried by a claw at the portion of the film denoted by 13" and continuously carried at a constant rate with a sprocket 8 at the portion of the film denoted by 13'''. But since the film carrying speed of the claw (not shown) is the same as that of the sprocket 8, the film loop once formed between the rollers 6 and 7 is maintained, whereby the film moves at a constant speed at the recording and reproducing head 14 by means of the constantly rotating sprocket 8. Thus, taking or projecting movies is well synchronized with recording or reproducing.

Figure 3:
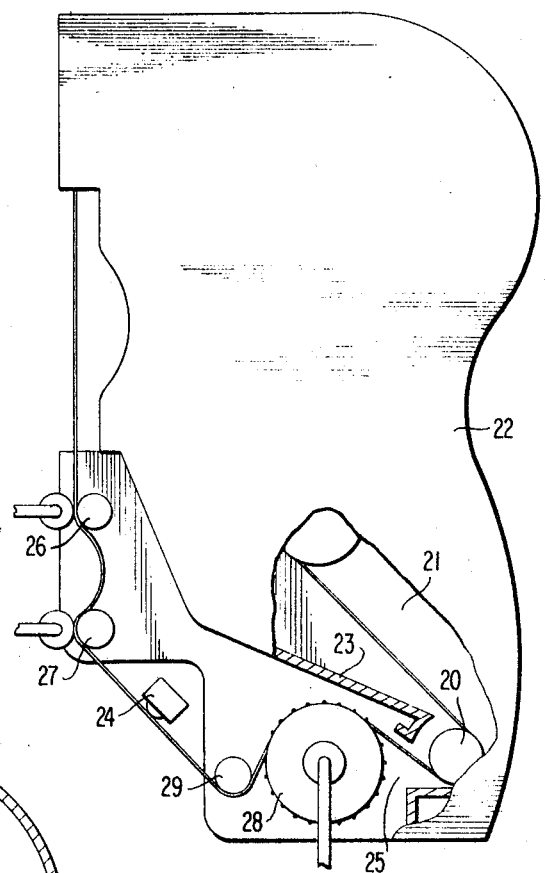
FIG. 3 is a view partly in section of another embodiment of the movie film magazine in accordance with the present invention.

Referring to FIG. 3, which shows another embodiment of the present invention, the sprocket 28 is disposed on the camera or projector (note that sprocket 8 of FIG. 1 is disposed on the film magazine). Sound drum 19 used in the embodiment of FIG. 1 is omitted by guiding the film over sound head 24 by roller 29. In this case, sprocket 28 is moved up to the position shown when the film magazine is loaded into the camera or projector.

Figure 4:
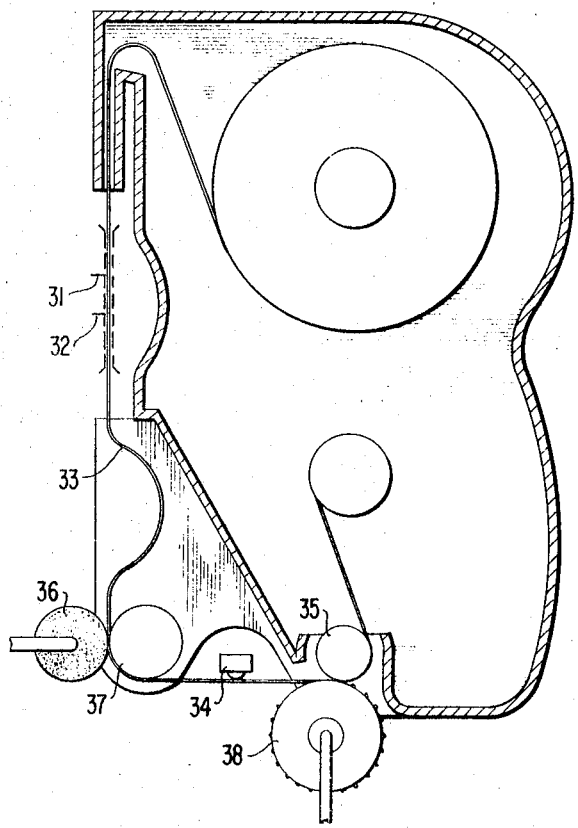
FIG. 4 is a view partly in section of the further embodiment of the movie film magazine in accordance with the present invention in which the number of the rollers used is reduced.

Referring to FIG. 4, which shows further embodiment of the film magazine in accordance with the present invention, the roller 6 or 26 in FIG. 1 or FIG. 3 is omitted wherein the function of roller 6 and the spring pressed roller 16 of the camera or projector is performed by film gate 31 and the film pressure plate 32 of the camera or the projector. Roller 37 shown in FIG. 4 is a loop maintaining roller rotatably mounted on the exposed portion of the magazine body portion 1'. Reference numeral 36 denotes a fly wheel formed of rubber for cooperating with feeding roller 37 after the magazine is loaded into the camera or projector. Reference numeral 35 denotes a roller corresponding to the guide-in rollers 10 and 20 in FIGS. 1 and 2, and has a groove for inserting the sprockets of sprocket wheel 38. Therefore, according to this embodiment, the number of the rollers is reduced and the structure of the film magazine simplified.

According to the present invention, the preparation for synchronous recording or the synchronous reproducing is greatly simplified, that is to put a film magazine into a camera or projector.

While the invention has been particularly shown and described with reference to preferred embodiments thereof, it will be understood by those skilled in the art that various changes in form and details may be made therein without departing from the spirit and scope of the invention.

What is claimed is:

1. A movie film magazine for synchronous sound recording or reproducing and adapted to be loaded into a movie camera or projector comprising:
   (a) a body portion;
   (b) a cover portion of a size smaller than said body portion so as to leave a part of said body portion exposed;
   (c) a film feed-out hub and a film take-up hub;
   (d) a film lead outlet and a film inlet formed by said body and cover portions;
   (e) a loop maintaining roller rotatably carried on the exposed part of said body portion and adapted to contact through the film a spring pressed roller on said camera or projector;
   (f) a driven sprocket wheel having a constant speed; and
   (g) a recording and reproducing head positioned between said loop maintaining roller and said sprocket wheel.

2. A movie film magazine as defined in claim 1 wherein said recording and reproducing head is carried by said exposed part of said body portion and is adapted to contact through the film a spring pressed sound drum carried by the camera or projector.

3. A movie film magazine as defined in claim 1 wherein said recording or reproducing head is carried by camera or projector and is inserted through an opening in the exposed part of said body portion.

4. A movie film magazine as defined in claim 1 wherein said sprocket wheel is carried on the camera or projector in a position adjacent the exposed part of said body portion.

5. A movie film magazine as defined in claim 1 further including a feed roller between said film lead outlet and said loop maintaining roller; and a loop forming lever carried by said camera or projector and movable to a first position between said feed roller and said loop maintaining roller to form a loop in the film and to a second position away from said film.

6. A movie film magazine as defined in claim 1 further including a film gate and a film pressure plate carried by said camera or projector between said film lead outlet and said loop maintaining roller; and a loop forming lever carried by said camera or projector and movable to a first position between said film gate and pressure plate and said loop maintaining roller to form a loop in the film and to a second position away from the film.

7. A movie film magazine as defined in claim 2 further including a feed roller between said film lead outlet and said loop maintaining roller; and a loop forming lever carried by said camera or projector and movable to a first position between said feed roller and said loop maintaining roller to form a loop in the film and to a second position away from said film.

8. A movie film magazine as defined in claim 3 further including a feed roller between said film lead outlet and said loop maintaining roller; and a loop forming lever carried by said camera or projector and movable to a first position between said feed roller and said loop maintaining roller to form a loop in the film and to a second position away from said film.

9. A movie film magazine as defined in claim 2 wherein said sprocket wheel is carried on the camera or projector in a position adjacent the exposed part of said body portion.

10. A movie film magazine as defined in claim 3 wherein said sprocket wheel is carried on the camera or projector in a position adjacent the exposed part of said body portion.

11. A movie film magazine as defined in claim 3 further including a film gate and a film pressure plate carried by said camera or projector between said film lead outlet and said loop maintaining roller; and a loop forming lever carried by said camera or projector and movable to a first position between said film gate and pressure plate and said loop maintaining roller to form a loop in the film and to a second position away from the film.

References Cited

UNITED STATES PATENTS

| 2,449,705 | 9/1948 | Jones | 352—73 X |
| 3,300,270 | 1/1967 | Finnerty | 352—78 X |

NORTON ANSHER, Primary Examiner

A. MATHEWS, Assistant Examiner

U.S. Cl. X.R.

352—27